United States Patent [19]

Negoro

[11] Patent Number: 4,868,673
[45] Date of Patent: Sep. 19, 1989

[54] LASER BEAM SCANNING DEVICE

[75] Inventor: Ikuo Negoro, Sakado, Japan

[73] Assignee: Asahi Kogaku Kogyo K.K., Tokyo, Japan

[21] Appl. No.: 120,629

[22] Filed: Nov. 13, 1987

[30] Foreign Application Priority Data

Nov. 14, 1986 [JP] Japan .................................. 61-271398
Dec. 10, 1986 [JP] Japan .................................. 61-190367

[51] Int. Cl.⁴ .............................................. H04N 1/21
[52] U.S. Cl. ..................................... 358/296; 346/108
[58] Field of Search ................ 346/108; 358/296, 300, 358/302

[56] References Cited
U.S. PATENT DOCUMENTS
4,297,713 10/1981 Ichikawa et al. .................... 346/108

Primary Examiner—Joseph W. Hartary
Assistant Examiner—Lincoln Donovan
Attorney, Agent, or Firm—Sandler & Greenblum

[57] ABSTRACT

A laser beam scanning device which includes a mounting arrangement for securely holding at fixed locations along an optical path of a laser beam, a device for generating laser beams, a collimator, a device for deflecting the laser beams and for scanning a predetermined region with the reflected laser beams, and a device for regulating the scanning speed of the laser beams so that the scanning speed will be substantially uniform in the above predetermined region, as an integrally connected unit.

16 Claims, 5 Drawing Sheets 4,868,673

LASER BEAM SCANNING DEVICE

BACKGROUND OF THE INVENTION

This invention relates to a laser beam scanning device adapted for use in, for instance, a laser beam printer in which printing is performed by transferring and setting the information formed by means of a laser beam on a photosensing drum and onto transfer paper.

In the above laser beam, which is printer, the laser beam responsive to information to be recorded, scans the electrified circumferential surface of a photosensing drum in the axial direction of the drum (horizontal scanning), while also scanning it in its circumferential direction upon its rotation (vertical scanning). The latent image thus formed on the circumference of the photosensing drum by virtue of varying electrostatic effects due to exposure to the laser beam is electrophotographically developed on the transfer paper with toners.

The laser beam scanning device typically comprises a semiconductor laser radiating a laser beam responsive to an input signal, and a series of optical elements through which the beam from the laser is conducted to the photosensitive drum, the series of optical elements includes a collimator lens, a cylindrical lens, a polygonal scanner, and a fθ lens. In conventional laser printers, these optical elements have been independently mounted on a chassis or assembly base.

Extraordinary precision, which is incomparable to that for other structural parts, is required for setting up the relative distances and relative installation angles between such optical elements, especially between the semiconductor laser, the cylindrical lens, the polygonal scanner and the fθ lens. It means that these individual elements must be installed with such high precision. Not only that, the chassis or assembly base for supporting these elements must be manufactured with such extreme precision.

When any failure occurs in the installation precision required for such optical elements due to ambient temperature variations and vibrations, it is necessary to perform part replacement in specially equipped places, as well as re-adjustment with the same precision as in the first assembly. The associated problem have therefore been a resultant time-consuming and less efficient process for production, replacement and adjustment.

SUMMARY OF THE INVENTION

It is therefore an object of the present invention to provide a laser beam scanning device which is easy to assemble and maintain.

For the above purpose, a scanning device is provided comprising mounting means for securely holding, at fixed locations along an optical path of a laser beam, at least means for generating laser beams, means for collimating laser beams generated by said laser beam generating means, means for deflecting said laser beams and for scanning a predetermined region with said deflected laser beams, and means for regulating the scanning speed of said laser beams so that said scanning speed will be substantially uniform in said predetermined region, and, wherein said beam generating means, said collimating means, said deflecting means and said regulating means comprise an integrally connected unit.

DESCRIPTION OF THE ACCOMPANYING DRAWINGS

DESCRIPTION OF THE PREFERRED EMBODIMENTS

Figure 1:
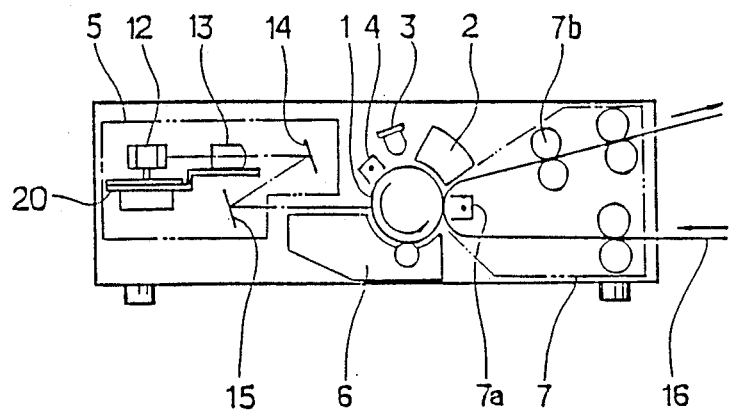
FIG. 1 is a diagrammatical explanatory view showing a laser beam printer adapted for use in a laser beam scanning device embodying the invention.

Illustrated in FIG. 1 is a laser beam printer embodying the invention wherein a toner cleaning section 2, a de-electrified section 3, an electrified section 4, an optical system section 5 with an optical system which directs laser beams to a photo-sensor drum 1 which includes a laser beam scanning unit 20, an image developing section 6 and an image transfer mechanism 7 are arranged around the photo-sensor drum 1 in due order in the direction of drum rotation indicated by an arrow in FIG. 1.

Figure 2:
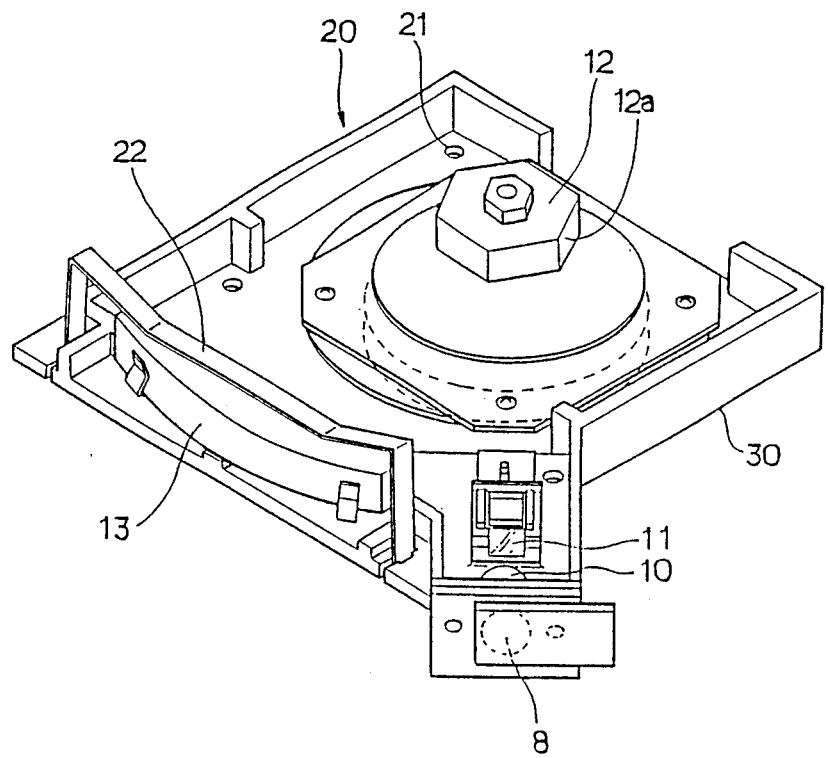
FIG. 2 is a perspective view of the laser beam scanning device adopted in the laser beam printer illustrated in FIG. 1.
Figure 3:
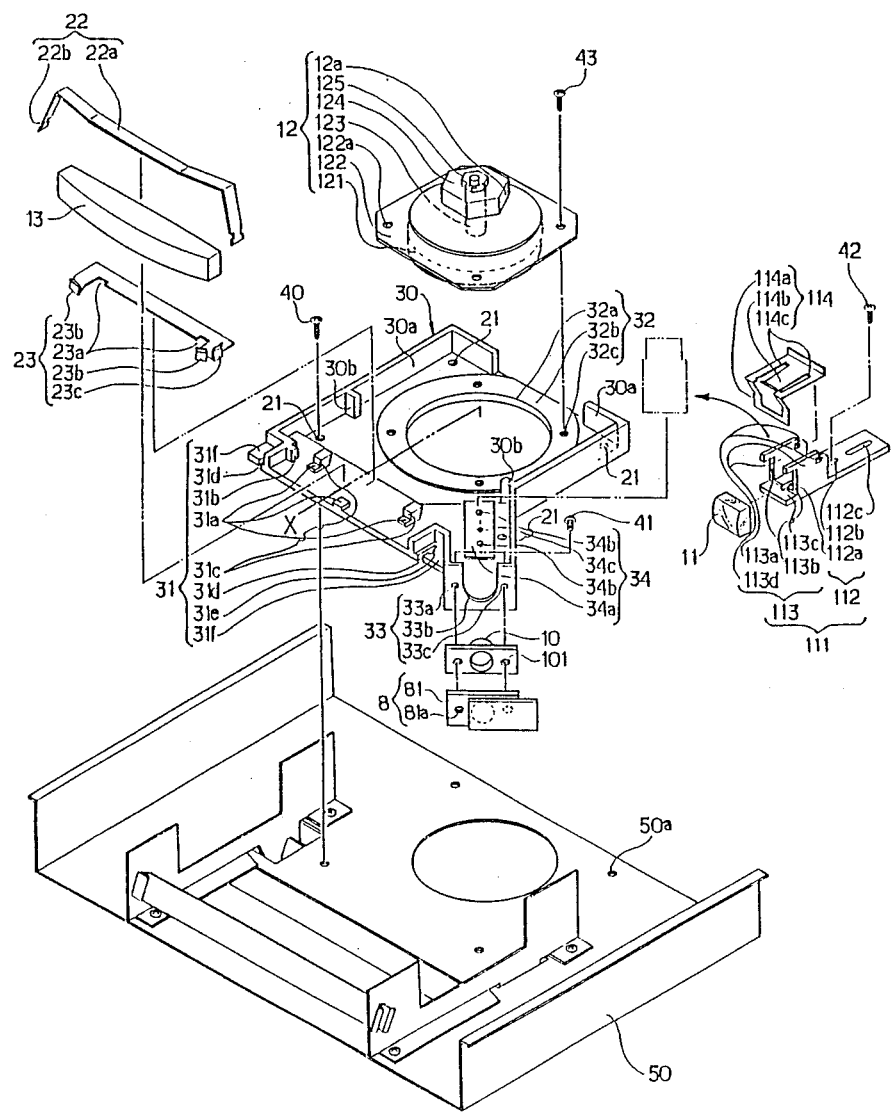
FIG. 3 is a perspective disassembled view of the scanning device illustrated in FIG. 2.

The beam scanning unit 20 comprises, as illustrated in FIGS. 2 and 3, a semiconductor laser 8 radiating laser beams, a cylindrical lens 11, a polygonal scanner 12 and a fθ lens 13 which are fixedly mounted on a dedicated unit base 30 at certain locations with precisely set relative distances and installation angles with respect to each other. Mirrors 14 and 15 (FIG. 1) are mounted within the optical system 5 to direct the laser beams to the photo-sensor drum 1.

Specifically, the unit base 30 is formed with a fθ lens mounting section 31 at one end thereof along the center line X of the laser beam scanning angle and a polygonal scanner mounting area 32 extending generally over the center area near the other end of the unit base 30. With the polygonal scanner 12 mounted on the polygonal scanner mounting area 32, a semiconductor laser mounting unit 33 is provided on an extension of the center of the polygonal scanner 12 at an angle of 45° away from the center line X of the laser beam scanning angle such that it projects by an amount corresponding to a certain length of beam path. A cylindrical lens mounting unit 34 is formed along the laser beam axis between the semiconductor laser mounting unit 33 and the polygonal scanner mounting area 32.

Wall 30a is raised its entire length except for the part of the fθ lens mounting unit 31 through which the scanning laser beam is passed and the part interfering with the components of polygonal scanner 12. The wall 30a is formed with reinforcing ribs 30b at several locations on its inner surface. At the corner areas which do not interfere with those components, formed are installation holes 21 for securing the beam scanning unit 20 to a chassis 50 by means of screws 40.

The wall section raised a little higher than other section forms an installation plane 33a of the semiconductor laser mounting unit 33, which is provided with a U-section cutaway 33b and a pair of semiconductor laser mounting holes 33c on either side of the cutaway 33b.

The polygonal scanner mounting area 32 is formed with a recess 32a for accommodating a polygonal scanner drive motor 121. Elevated from the edge of recess 32a is a drive motor mounting seat 32b which secures thereon a motor fixing flange 122 integrally formed with the casing of the polygonal scanner motor 121. The drive motor mounting seat 32b is provided with screw holes 32c which match screw holes 122a cut through the four corners of the drive motor mounting flange 122.

The fθ lens mounting unit 31 is provided with a plurality of down position limiting projections 31a whose bottom surfaces are raised a little higher than the bottom surface of the polygonal scanner mounting area 32 to restrict up and down movements of the fθ lens 13 and side limiting projections 31b and 31c which restrict horizontal movements of the fθ lens 13. The base portion 31f located outside the wall 30a has slits 31d, 31d which engageably receive the both leading edges of an upper holder 22 which holds the top of the fθ lens 13 under pressure and an engagement section 31e formed by cutting away part of the slit 31d with a certain width thereof.

The cylindrical lens mounting unit 34 has a bottom surface raised a little higher than the polygonal scanner mounting area like the fθ lens mounting unit 31. It also includes a lens holder mounting seat 34a to limit down movement of a lens holder 111 securely supporting the cylindrical lens 11, which seat 34a is further elevated from the bottom surface. Also formed are guide projections 34b, 34b which slidably guide the lens holder 111 along the optical axis by inserting themselves into front and rear slots 112a and 112c of the three slots 112a, 112b and 112c serially formed on the lens holder 111. A screw hole 34c is formed intermediate between the guide projections 34b, 34b to receive a fixing screw 42 screwed thereinto through the center slot 112b.

The drive motor mounting seat 32b of the polygonal scanner mounting area 32, the down position limiting plane of the projection 31 of the fθ lens mounting unit 31, and the lens holder mounting seat 34a are thus accurately designed and manufactured so that the level differences among them and parallelism with one another maintains a predetermined high precision value. In addition, the crossing angle of the semiconductor laser mounting plane 33a of the semiconductor laser mounting unit 33 with respect to the mounting planes of the components mentioned above are set to an accurate right angle with a required manufacturing precision.

The optical elements and components arranged as above are mounted on the unit base 30 in a manner to be described below.

The semiconductor laser 8 is secured to the mounting plane 33a with a predetermined accuracy by screwing a screw 41 into a mounting hole 81a cut in a laser mounting flange 81 through the mounting hole 33c provided at the semiconductor laser mounting 33a. Upon mounting the semiconductor laser 8, the collimator lens 10 can be integrally secured with a required precision by clamping the lens fixing flange 10 between the laser mounting flange 81 and the laser mounting plane 33a and fastening them together by the screw 41.

The polygonal scanner 12 is fixedly mounted such that the drive motor 121 is first securely fastened to the drive motor mounting seat 32b by screwing the screw 43 into the screw hole 32c formed on the seat 32b of the polygonal scanner mounting area 32, a rotary shaft 123 vertically projecting beyond the drive motor 121 is inserted into the center mounting hole of a rotary polygonal mirror 124 coated at each side of hexagonal prism with light reflecting materials, and finally a nut 125 is tightly fastened to the top of the motor rotary shaft 123 which projects from the top of the polygonal mirror 124.

The fθ lens 13 is secured to the fθ lens mounting unit 31 by means of a fθ lens bottom holder 23 and the fθ lens top holder 22.

The fθ lens bottom holder 23 is provided with cutaways 23a, 23a which engage with the back side of the position limiting projections 31c, 31c formed on the unit base 30 and is made of a springy metal plate formed upright on one side with a front biasing member 23b and a side biasing member 23c which biases the fθ lens 13 toward the side limiting projection 31b and backward position limiting projections 31c, 31c.

The fθ lens top holder 22 is made of a springy metal plate of a certain width which consists of a fθ lens pressing section 22a formed by stepping downward at its flat center, and engagement pieces 22b, 22b formed by cutting part away from the bent edge portions at its both ends for narrower width, which pieces engage the cutaway 31e, 31e provided in the slits 31d, 31d of the fθ lens mounting unit 31.

The cutaways 23a, 23a of the fθ lens bottom holder 23 engage the position limiting projections 31c, 31c of the fθ lens mounting unit 31, whereby the front, rear, right and left faces of the fθ lens 13 are limited in respect of its right and left positions by means of a return spring force developed due to deformation of the biasing members 23b, 23c. Also, with the fθ lens top holder 22 abutting the top surface of the fθ lens 13, the engagement pieces 22a, 22a provided to the end of the top holder 22 are inserted into the slits 31e, 31e of the lens mounting unit 19a to bring the narrower portion of the piece 22a into engagement with the cutaways 31f, whereby the fθ lens 13 is biased toward the down movement limit plane by means of a return spring force developed due to deformation of the pressing section 22a of the fθ lens top holder 22, to securely hold the fθ lens 13 in a certain limited vertical position.

The cylindrical lens 11 is fixed to the lens holder 111 by means of the lens retainer 114 so that its convex surface faces outward and its cylindrical axis is kept horizontal. The lens holder 111 is mounted on the lens holder mounting seat 34a of the cylindrical lens mounting unit 34 so that it causes the convex surface of the cylindrical lens 11 to face the semiconductor laser 8, while allowing adjustment of the direction of laser beam optical axis.

The lens holder 111 is provided with a mounting plate 112 having slots 112a, 112b, 112c serially arranged to serve as slide guides as well as fixing holes, and raised ribs 113a, 113a at the both ends of the mounting plate 112, so that the end face of the rib 113a serves as a back position limit plane 113b to allow abutting of the back surface of the cylindrical lens 11. The surface plane of the mounting plate 112 crossing the back position limit plane 113b at right angle serves as a down position limit plane 113c which allows abutting the bottom surface of the cylindrical lens 11. Also, the upper rear end of each rib 224a is cut away to form a holder piece 113 provided with an engaging lug 113d engageable with the lens retainer 114 to be described below.

The lens retainer 114 is formed by a springy metal plate wider than the distance between the ribs 113a and 113b of the lens holder 111. The metal plate has an engagement section 114c cut to the width of the rib 113a of the lens holder 111, which section 114c is engaged with the engaging lug 113d formed at the rear end of the rib 113a to set up a limit reference point when mounting the lens 11.

The lip-shaped section between the cutaways 114c is bent down to form a lens top biasing member 114b. Also, extensions of the two leg sections outside the ribs 113a are bent downward to form a lens front biasing member 114a which abuts the lens portion right under the thickest portion of the convex (center of the line perpendicular to the axis) respectively at the right and left ends of the cylindrical lens 11 convex thereby horizontally biasing the cylindrical lens 11.

The cylindrical lens 11 is fixed in position in a manner that after it is placed in contact with the back and the bottom position limit plane 113b, 113c of a support member 113, the cutaways 114c of the lens retainer 114 catch therein the engagement pieces 113d at the rib rear ends. As a result, the top biasing member 114b deformed applies a return spring force to the top of the cylindrical lens 11, while the front biasing member 114a deformed likewise applies a return spring force to the convex of the lens 11, whereby the lens 11 is biased toward the respective limit planes 113b and 113c. On the other hand, the front biasing member 114a abuts against the portion under the thickest convex portion (center of the line perpendicular to the axis) to hold the cylindrical lens 11 in position despite of the biasing force of the top biasing member 114b.

The guide projections 34b, 34b on the cylindrical lens mounting unit 34 are then inserted into the slots 112a, 112c formed on the mounting plate 112 which serve as guides for sliding the lens holder 111 therealong in the direction of the laser beam axis. The cylindrical lens 11 is thus moved along the laser beam axis between the semiconductor laser 8 and the polygonal scanner 12 so as to adjust the convergence of the laser beam onto the polygonal scanner 12. After the adjustment is completed, the screw 42 passed through the slot 112b at the center of the mounting plate 112 is securely fastened to the screw hole 34c formed in the cylindrical lens mounting unit 34.

The beam scanning unit 20 thus comprised is to be mounted, as a single separate unit, on the chassis 50 with a required mounting accuracy by fastening the screws 40 passed through the mounting holes 21 of the unit base 30 into screw holes 50a formed on the chassis 50 at their corresponding locations. Such mounting of the beam scanning unit 20 on the chassis 50 with predetermined locating precision means that all the optical elements on the unit 20 are fixedly mounted on the chassis 50 with predetermined locating precision.

With the beam scanning unit 20 as above constructed, the laser beam emitted from the semiconductor laser 8 in response to an input signal delivered from a signal output device, not shown, is transformed to a parallel beam through the collimator lens 10. It is then passed through the cylindrical lens 11 which adjusts the shape of the beam. The cylindrical axis is located to cross at right angle the polygonal scanner rotary axis positioned ahead along the optical axis and is converted onto the polygonal scanner 12 as a linear image perpendicular to the polygonal scanner rotary axis. The polygonal scanner 12 causes the incident laser beam to deflect and scan at the multiple reflection surfaces 12a which are rotated about the rotary axis. The fθ lens 13 corrects the laser beam direction to converge it onto the axial straight line on the circumferential surface of the photosensing drum 1. It also makes the scanning speed constant and shapes the image which is then let out from the beam scanning unit 20.

The arrangement as described above enables all the optical elements (semiconductor laser, cylindrical lens, polygonal scanner and fθ lens) which require a particular installation accuracy to be assembled at one time with a predetermined precision simply by screw-fastening the deflection scanning optical unit 20 to the chassis 50 during assembly. Referring to maintenance, the beam scanning unit 20 in failure is simply removed for repair and a new one can be mounted merely by screwing just as in assembly without any relocating or re-adjustment procedure which has been required for earlier optical element assemblies.

Figure 4:
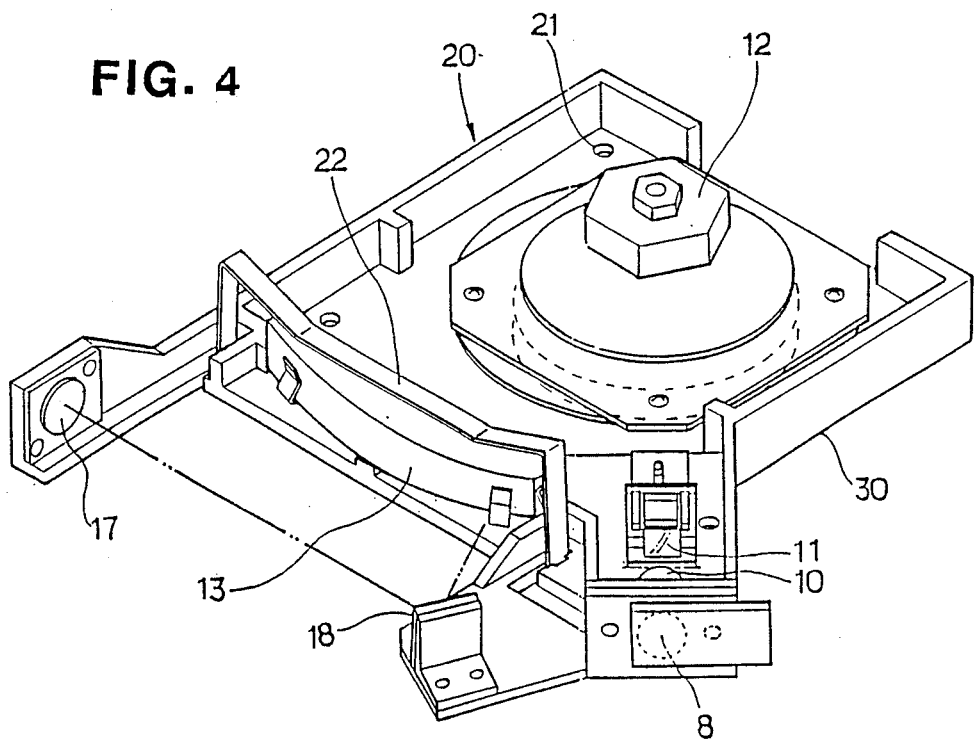
FIG. 4 is a perspective view of a modified embodiment of the laser beam scanning device.

While in the foregoing embodiment, the semiconductor laser 8, the collimator lens 10, the cylindrical lens 11, the polygonal scanner 12 and the fθ lens 13 are formed as one unit, the unit may include a photo-sensor 17 for horizontal sync control of laser beams and a second reflection mirror 18 located at the end of the laser beam scanning area to direct the laser beam into the photo-sensor 17, which are both mounted on the same unit base with a predetermined precision (See FIG. 4).

Figure 5:
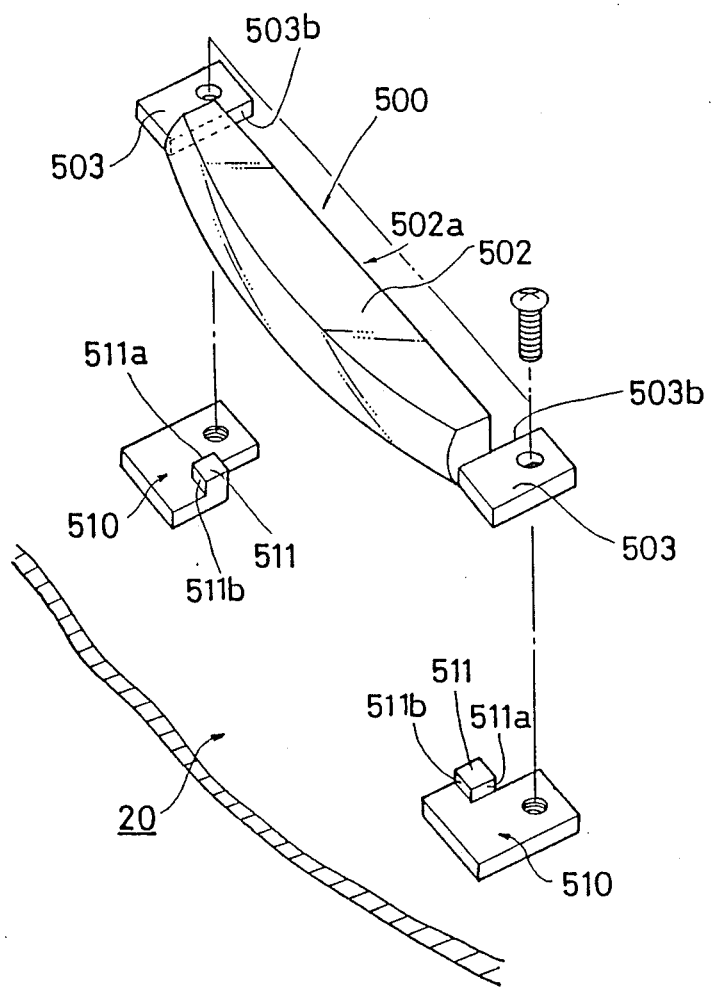
FIG. 5 is a perspective disassembled view of a modified embodiment of a fθ lens.

Further, a modified fθ lens 500 illustrated in FIG. 5 securely fixed on the unit 20, can instead be adopted.

The modified fθ lens 500 comprises a lens portion 502 and a pair of lens holder portions 503, 503 formed at both sides of the lens portion 502, which are integrally fabricated of optical-plastic materials such as Styrene-Acrylonitrile or Polycarbonate by injection moldings or the like.

On the unit 20, a pair of platforms 510, 510 are formed for seating the pair of lens holder portions 503, 503 thereon respectively. Each platform 510 is provided with a stopper 511 having a pair of surfaces 511a and 511b which contact the rear surface 502a of the lens portion 502 and the inner side surface 503b of each lens holder portion 503, respectively, to regulate the seating position of the fθ lens 500. The fθ is then seated on the pair of platforms 510, 510 by screw-fastening the pair of lens holder portions 503, 503 thereto.

With the above modified fθ lens 500 and the platforms 510, 510, it becomes remarkably easy to fixedly mount the fθ lens 500 on its predetermined position on the unit 20 and the accessaries for mounting it becomes unnecessary.

Moreover, a galbano mirror or a hologram scanner can be adopted instead of the polygonal mirror to deflect the laser beam, and an arc-sign lens can be adopted instead of the fθ lens.

The laser beam printer as above described comprises a separate beam scanning unit consisting of the semiconductor laser, the cylindrical lens, the polygonal scanner and the fθ lens which are mounted on the dedicated frame with such an installation accuracy as required for these elements. As a result, the mounting base which requires itself a high manufacturing precision can be made more compact and arrangements of the optical elements can be more easily handled for assembly and maintenance as a single separate unit. Further, handling the optical elements as the unit allows easier design modification including the change in parts location.

I claim:

1. A laser beam scanning device comprising mounting means for securely holding at fixed locations along an optical path of a laser beam, at least
    means for generating laser beams,
    means for collimating laser beams generated by said laser beam generating means,
    means for deflecting said laser beams and for scanning a predetermined region with said deflected laser beams,
    means for regulating the scanning speed of said laser beams so that said scanning speed will be substantially uniform in said predetermined region, and
    a photo-sensor for generating sync-signals and a reflective mirror for directing said laser beam toward said photo-sensor,
    wherein said mounting means comprises a unit base which is substantially rectangular and has four corners, one of said corners including an extension projecting outwardly from said one corner, said deflecting means being positioned on a central position of said unit base and said beam generating means being positioned on said extension, said regulating means being located along one side edge of said unit base adjacent said extension, said unit base being provided with a side wall extending from one of said corners adjacent said side edge to fixedly hold said photo-sensor thereon, said photo-sensor therefore being arranged outside said predetermined region, and a second extension projected from said side edge to fixedly hold said reflective mirror at the end of said predetermined region, so that said reflective mirror reflects said laser beam past said regulating means toward said photo-sensor,
    and, wherein said beam generating means, said collimating means, said deflecting means, said photo-sensor, said reflective mirror and said regulating means comprise an integrally connected unit.

2. The laser beam scanning device according to claim 1 wherein said beam generating means comprises a semiconductor laser.

3. The laser beam scanning device according to claim 1 wherein said collimating means comprises a collimater lens.

4. The laser beam scanning device according to claim 1 wherein said deflecting means comprises a polygonal mirror.

5. The laser beam scanning device according to claim 4 which further comprises a cylindrical lens arranged upstream of said polygonal mirror, and wherein said cylindrical lens is securely held at its fixed location on said mounting means.

6. The laser beam scanning device according to claim 1 wherein said regulating means comprises a f$\theta$ lens.

7. The laser beam scanning device according to claim 6 wherein said f$\theta$ lens comprises a lens portion and a pair of lens holder portions integrally formed at both sides of said lens portion.

8. The laser beam scanning device according to claim 7 wherein said mounting means is provided with means for regulating rear position of said f$\theta$ lens and means for regulating both side positions of said f$\theta$ lens, said f$\theta$ lens being secured to its fixed position while rear position and back side position being regulated by said regulating means.

9. The laser beam scanning device according to claim 1 wherein said collimating means is positioned, in aligned fashion, between said beam generating means and said deflecting means.

10. The laser beam scanning device according to claim 1 wherein said photo-sensor is securely held at its fixed position on said mounting means.

11. The laser beam scanning device according to claim 1 wherein said unit base includes means for attaching said unit base to a laser beam printer.

12. The laser beam scanning device according to claim 11 wherein said unit base is attached to a predetermined surface of said laser beam printer.

13. The laser beam scanning device to claim 11 wherein said attaching means comprises means for attaching said unit base to said laser beam printer indirectly by attaching said unit base to a tray that is attached to said laser beam printer.

14. The laser beam scanning device according to claim 1 wherein said direction changing means includes a motor, and wherein said unit base includes a substantially flat surface having an aperture for receiving said motor.

15. The laser beam scanning device according to claim 1, wherein said unit base includes means for attaching said unit base to a machine frame, said attaching means comprising means for attaching said unit base to said machine frame indirectly by attaching said unit base to a chassis that is attached to said machine frame.

16. The laser beam scanning device according to claim 1, and further comprising at least one mirror for directing said deflected laser beams.

* * * * *